US010207694B2

(12) United States Patent
Minato et al.

(10) Patent No.: US 10,207,694 B2
(45) Date of Patent: Feb. 19, 2019

(54) PARKING BRAKE SYSTEM

(71) Applicant: NABTESCO AUTOMOTIVE CORPORATION, Tokyo (JP)

(72) Inventors: Ichiro Minato, Tokyo (JP); Hiroki Hasebe, Tokyo (JP); Kazuya Yoketa, Tokyo (JP); Katsunori Tanaka, Tokyo (JP)

(73) Assignee: Nabtesco Automotive Corporation, Tokyo (JP)

( * ) Notice: Subject to any disclaimer, the term of this patent is extended or adjusted under 35 U.S.C. 154(b) by 0 days.

(21) Appl. No.: 15/325,008

(22) PCT Filed: Jul. 10, 2015

(86) PCT No.: PCT/JP2015/069934
§ 371 (c)(1),
(2) Date: Jan. 9, 2017

(87) PCT Pub. No.: WO2016/006695
PCT Pub. Date: Jan. 14, 2016

(65) Prior Publication Data
US 2017/0197603 A1    Jul. 13, 2017

(30) Foreign Application Priority Data

Jul. 11, 2014   (JP) ................. 2014-143579

(51) Int. Cl.
*B60T 15/04*    (2006.01)
*B60T 7/20*    (2006.01)
(Continued)

(52) U.S. Cl.
CPC ............. *B60T 15/041* (2013.01); *B60T 7/20* (2013.01); *B60T 13/26* (2013.01); *B60T 13/261* (2013.01);
(Continued)

(58) Field of Classification Search
CPC ...... B60T 15/041; B60T 17/004; B60T 17/22; B60T 13/36; B60T 13/683; B60T 7/20
See application file for complete search history.

(56) References Cited

U.S. PATENT DOCUMENTS

| 2004/0145237 A1 | 7/2004 | Duchet et al. |
| 2004/0195910 A1 | 10/2004 | Aumuller et al. |

(Continued)

FOREIGN PATENT DOCUMENTS

| DE | 10314642 B3 | 11/2004 |
| DE | 60208804 T2 | 7/2006 |

(Continued)

OTHER PUBLICATIONS

International Search Report as issued in International Patent Application No. PCT/JP2015/069934, dated Sep. 8, 2015.

(Continued)

*Primary Examiner* — Vishal R Sahni
(74) *Attorney, Agent, or Firm* — Pillsbury Winthrop Shaw Pittman, LLP

(57) ABSTRACT

A parking brake system for electrically controlling a parking brake of a vehicle is provided. The parking brake system includes a parking brake provided for each wheel, an air dryer controller, and an actuator. The air dryer controller is provided to an air dryer to electrically control the parking brake. The air dryer dries compressed air for use in the parking brake. The actuator is provided for each axle of the wheel to actuate the parking brake with the compressed air in accordance with an electric signal from the air dryer controller.

9 Claims, 9 Drawing Sheets

(51) Int. Cl.
*B60T 13/36* (2006.01)
*B60T 13/68* (2006.01)
*B60T 17/00* (2006.01)
*B60T 17/22* (2006.01)
*B60T 13/26* (2006.01)
*B60T 13/38* (2006.01)
*B60T 13/66* (2006.01)

(52) U.S. Cl.
CPC ............ *B60T 13/263* (2013.01); *B60T 13/36* (2013.01); *B60T 13/385* (2013.01); *B60T 13/662* (2013.01); *B60T 13/683* (2013.01); *B60T 17/004* (2013.01); *B60T 17/22* (2013.01)

(56) References Cited

U.S. PATENT DOCUMENTS

| | | | |
|---|---|---|---|
| 2008/0030071 A1 | 2/2008 | Duchet et al. | |
| 2011/0005874 A1* | 1/2011 | Beier | B60T 7/042 188/106 F |
| 2012/0153711 A1* | 6/2012 | Minato | B60T 13/662 303/10 |
| 2012/0306259 A1* | 12/2012 | Minato | B60T 13/662 303/6.01 |

FOREIGN PATENT DOCUMENTS

| | | |
|---|---|---|
| EP | 1366964 A2 | 12/2003 |
| EP | 1731394 A1 | 12/2006 |
| JP | 2007-326516 A | 12/2007 |
| JP | 2009-023627 A | 2/2009 |
| JP | 2009-078760 A | 4/2009 |
| JP | 2013-505876 A | 2/2013 |
| JP | 2013-505877 A | 2/2013 |
| JP | 2013-132991 A1 | 7/2013 |
| JP | 2014-019235 A | 2/2014 |
| WO | WO 2011/039558 A1 | 4/2011 |
| WO | WO 2011/039559 A1 | 4/2011 |

OTHER PUBLICATIONS

International Preliminary Report on Patentability and the Written Opinion of the International Searching Authority as issued in International Patent Application No. PCT/JP2015/069934, dated Sep. 8, 2015.
Supplementary European Search Report EP Application No. 15819287.2 dated Jan. 8, 2018.
Communication pursuant to Article 94(3) European Patent Application No. 15819287.2 dated Oct. 15, 2018.

* cited by examiner

PARKING BRAKE SYSTEM

CROSS-REFERENCE TO RELATED APPLICATIONS

This application is the U.S. National Stage of PCT/JP2015/069934, filed Jul. 10, 2015, which in turn claims priority to Japanese Patent Application No. JP 2014-143579, filed Jul. 11, 2014. The contents of these applications are incorporated herein by reference in their entireties.

TECHNICAL FIELD

The present invention relates to a parking brake system configured to electrically control a parking brake of a vehicle.

BACKGROUND ART

Heretofore, vehicles have employed mechanical parking brakes operated with pedals and levers. In recent years, vehicles have employed electric parking brakes configured to actuate the parking brakes by switching operations (see, for example, Patent Document 1). In such an electric parking brake, the parking brake can be actuated and released by the operations on the switch at the driver's seat.

According to the electric parking brake system disclosed in Patent Document 1, the parking brake is actuated via an electric actuator.

PRIOR ART DOCUMENT

Patent Document

Patent Document 1: Japanese Laid-Open Patent Publication No. 2007-326516

SUMMARY OF THE INVENTION

Problems that the Invention is to Solve

Large vehicles such as trucks and trailers employ air brakes in which compressed air is used. There is a demand for a parking brake system configured to electrically control a parking brake in which an air brake is used.

An objective of the present invention is to provide a parking brake system capable of performing electric control in a configuration where an air brake is employed.

Means for Solving the Problems

Means for achieving the above objective and advantages thereof will now be described.

To achieve the foregoing objectives and in accordance with one aspect of the present invention, a parking brake system for electrically controlling a parking brake of a vehicle is provided. The parking brake system includes a parking brake provided for each wheel, an air dryer controller, and an actuator. The air dryer controller is provided to an air dryer to electrically control the parking brake. The air dryer is configured to dry compressed air for use in the parking brake. The actuator is provided for each axle of the wheel to actuate the parking brake with the compressed air in accordance with an electric signal from the air dryer controller.

With the above configuration, the air dryer controller electrically controls the parking brake via the actuator. More specifically, the air dryer controller actuates, by an electric signal, the actuator provided to the axle, and the actuator actuates the parking brake. Therefore, in a configuration where an air brake is used, the parking brake is electrically controllable.

In the above described parking brake system, the actuator preferably includes a solenoid valve that controls supply of the compressed air to the parking brake, and a driver configured to actuate the parking brake by electrifying the solenoid valve based on the electric signal from the air dryer controller. The driver is preferably electrically connected to the solenoid valve and actuates the parking brake by electrifying the solenoid valve.

With the above configuration, by electrifying the solenoid valve with the driver, the parking brake is actuated with the compressed air.

In the above described parking brake system, the air dryer controller is preferably connected to an in-vehicle network configured to transmit data of mutually connected devices, and acquires operation information of the parking brake through the in-vehicle network.

With the above configuration, the air dryer controller easily acquires the operation information of the parking brake through the in-vehicle network.

In the above described parking brake system, the air dryer controller preferably performs failure detection through the in-vehicle network, and maintains current status of the parking brake when detecting a failure.

With the above configuration, when a failure is detected, the current status of the parking brake is maintained. Therefore, even when a failure (e.g., failure in the supply of the compressed air) occurs, a safe operation is realized by maintaining the current status.

Effects of the Invention

According to the present invention, the electric control of a parking brake is realized in a configuration where an air brake is used.

MODES FOR CARRYING OUT THE INVENTION

With reference to FIGS. 1 to 8, a description will be given of an embodiment of a parking brake system applied to a brake system for an articulated vehicle. The brake system includes both a parking brake and a service break, which are air brakes deriving their driving source from the compressed dry air. The articulated vehicle is exemplarily a combination of vehicles where a tractor is connected to a trailer.

Figure 1:
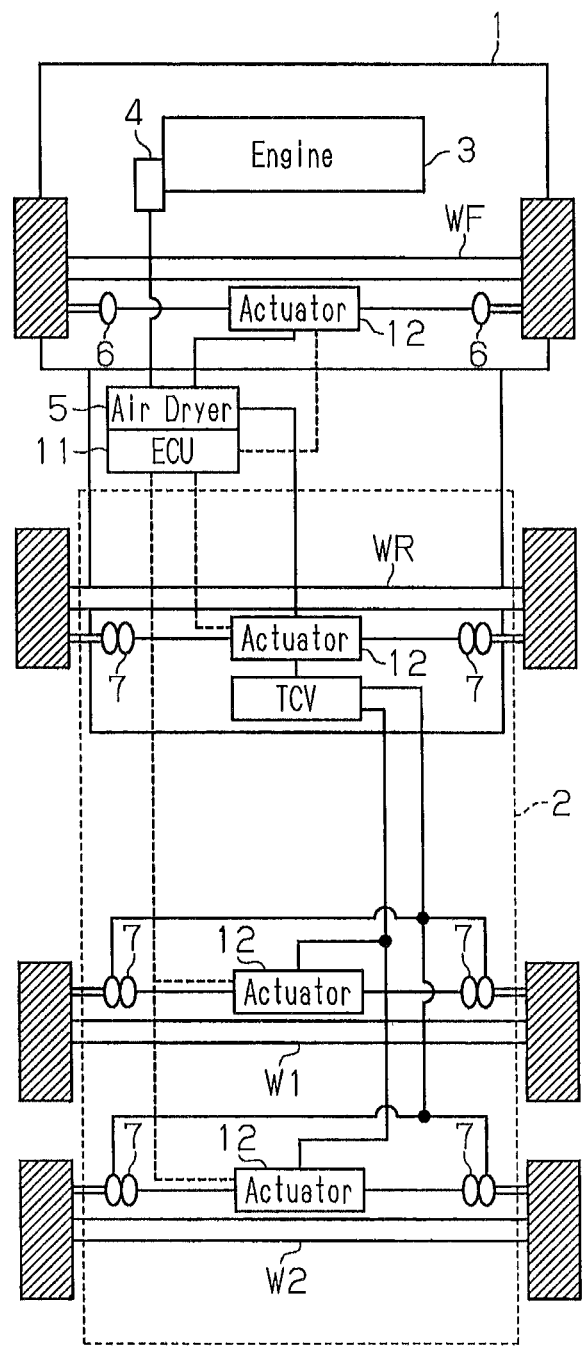
FIG. 1 schematically illustrates the configuration of a brake system provided to a tractor and trailer.

As shown in FIG. 1, a tractor 1 towing a trailer 2 includes two wheels at each of an axle WF for front wheels and an axle WR for rear wheels. Each wheel of the front-wheel axle WF of the tractor 1 has a service brake chamber 6 that provides only a service brake. Each wheel of the rear-wheel axle WR has a spring brake chamber 7 that provides a service brake and a parking brake. The trailer 2 includes two axles of a first axle W1 and a second axle W2. Each of the first axle W1 and the second axle W2 is provided with two wheels, and each wheel of the trailer 2 has the spring brake chamber 7 that provides the service brake and the parking brake.

The tractor 1 includes an engine 3, a compressor 4, and an air dryer 5. The compressor 4 is driven by the power from the engine 3. The air dryer 5 dries the compressed air fed by the compressor 4, and feeds the service brake chamber 6 and the spring brake chamber 7 with the compressed dry air via tanks (not shown).

The axles WF, WR, W1, and W2 are each provided with an actuator 12 configured to actuate the parking brake. The actuator 12 is controlled by an air dryer electronic control unit (ECU) 11 provided to the air dryer 5, and the air dryer ECU 11 serves as an air dryer controller.

Figure 2:
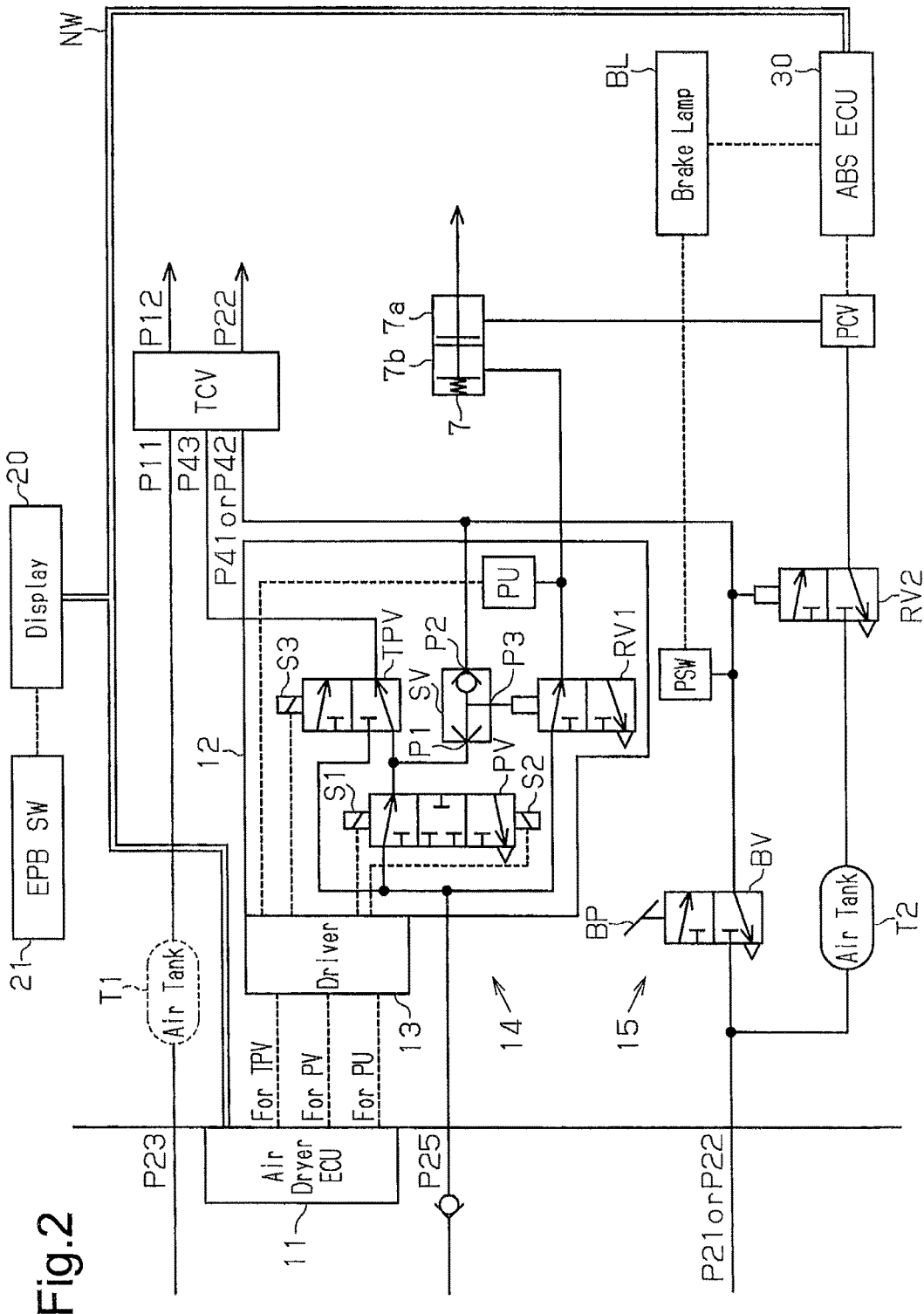
FIG. 2 is a block diagram illustrating the configuration of the brake system.

As shown in FIG. 2, the actuator 12 includes a parking brake circuit 14 configured to actuate the parking brake, and a driver 13 configured to electrify the parking brake circuit 14 in accordance with an electric signal from the air dryer ECU 11 for actuating the parking brake. The parking brake circuit 14 includes a parking valve PV (a solenoid valve) and a test position valve TPV. The driver 13, which derives its power source from a battery (not shown), electrifies the parking valve PV and the test position valve TPV included in the parking brake circuit 14 in accordance with the electric signal from the air dryer ECU 11.

The brake system is connected with either a twenty-first port P21 or a twenty-second port P22, a twenty-third port P23, and a twenty-fifth port P25, which are configured to deliver the compressed dry air from the air dryer 5. The twenty-first port P21 or the twenty-second port P22 is connected to a service brake circuit 15. The twenty-third port P23 is connected to a trailer control valve TCV. The twenty-fifth port P25 is connected to the parking brake circuit 14. The trailer control valve TCV is a valve connected to a brake provided to the trailer 2 and configured to control the brake of the trailer 2.

The parking brake circuit 14 is a circuit that actuates the spring brake chamber 7 via the driver 13 driven by the control of the air dryer ECU 11. The parking brake circuit 14 includes the parking valve PV, a shuttle valve SV, a first relay valve RV1, the test position valve TPV, and a pressure sensor PU.

The parking valve PV is a three-port three-position solenoid valve which shifts to any one of a filling position, a neutral position, and a discharge position depending on the conditions of the vehicle or the like. The parking valve PV includes a first solenoid S1 that shifts the parking valve PV to the filling position. The first solenoid S1 is electrified by the air dryer ECU 11 via the driver 13. When the first solenoid S1 is electrified via the driver 13, the parking valve PV is shifted to the filling position. At the filling position, the parking valve PV delivers to the downstream side the compressed dry air delivered from the twenty-fifth port P25.

The parking valve PV also includes a second solenoid S2 that shifts the parking valve PV to the discharge position. The second solenoid S2 is electrified by the air dryer ECU 11 via the driver 13. When the second solenoid S2 is electrified via the driver 13, the parking valve PV is shifted to the discharge position. At the discharge position, the parking valve PV discharges the compressed dry air on the downstream side to the outside.

When neither the first solenoid S1 nor second solenoid S2 of the parking valve PV is electrified, the parking valve PV is shifted to the neutral position. At the neutral position, the parking valve PV blocks the supply of the compressed dry air from the twenty-fifth port P25.

The shuttle valve SV has two supply ports of a first supply port P1 and a second supply port P2, and an output port P3. The output port P3 is connected to the first relay valve RV1. The first supply port P1 is connected to the twenty-fifth port P25 via the parking valve PV. The second supply port P2 is connected to the service brake circuit 15. The shuttle valve SV delivers through the output port P3 the compressed dry air of the supply port P1 or P2, whichever exhibits the higher pressure, and blocks the other one of the supply ports P1 and P2.

The first relay valve RV1 delivers the compressed air from the twenty-fifth port P25 to a second control chamber 7*b* through the shuttle valve SV. The second control chamber 7*b* controls the parking brake of the spring brake chamber 7 by the compressed dry air delivered from the shuttle valve SV. Further, when the supply of the compressed dry air from the shuttle valve SV is stopped, the first relay valve RV1 discharges the compressed dry air from the second control chamber 7*b*, and actuates the barking brake.

The test position valve TPV, which is a three-port two-position solenoid valve, delivers the compressed dry air delivered from the twenty-fifth port P25, to the trailer control valve TCV positioned further downstream than the test position valve TPV, through the parking valve PV, when the test position valve TPV is not electrified. The test position valve TPV includes a third solenoid S3 configured to drive the test position valve TPV. The third solenoid S3 is electrified by the air dryer ECU 11 via the driver 13. When the third solenoid S3 is electrified, the third solenoid S3 delivers the compressed dry air delivered from the twenty-fifth port P25, to the trailer control valve TCV without having the air pass through the parking valve PV. When the third solenoid S3 is not electrified, the third solenoid S3 delivers the compressed dry air delivered from the parking valve PV, to the trailer control valve TCV.

The trailer control valve TCV is a valve that delivers to the trailer 2 the compressed dry air having passed through the parking brake circuit 14 and the compressed dry air having passed through the service brake circuit 15. The trailer control valve TCV includes an eleventh port P11 for the service brake of the trailer 2, a forty-third port P43 connected to the test position valve TPV, and a forty-first port P41 or a forty-second port P42 connected to the service brake circuit 15. The eleventh port P11 is connected to the twenty-third port P23 of the air dryer 5. An air tank T1 may be provided at a position between the twenty-third port P23 and the eleventh port P11 as needed.

The trailer control valve TCV further includes a twelfth port P12 configured to actuate the service brake of the trailer 2, and a twenty-second port P22 configured to actuate the parking brake of the trailer 2. When the compressed dry air delivered from the service brake circuit 15 is inputted through the forty-first port P41 or the forty-second port P42, the trailer control valve TCV delivers the compressed dry air to the service brake circuit (not shown) of the trailer 2 via the twelfth port P12. When the compressed dry air is inputted from the test position valve TPV to the forty-third port P43, the trailer control valve TCV delivers the compressed dry air through the twenty-second port P22 to an emergency valve (not shown) of the trailer 2, and actuates the parking brake of the trailer 2.

The pressure sensor PU detects the pressure in the supply path of the compressed dry air between the first relay valve RV1 and the second control chamber 7b. The pressure sensor PU converts the detected pressure value to an electric signal, and transmits the electric signal to the air dryer ECU 11 via the driver 13.

Next, the service brake circuit 15 will be described. The service brake circuit 15 includes a brake valve BV connected to a brake pedal BP, a pressure switch PSW, a second relay valve RV2, and an air tank T2.

The brake valve BV is connected to the forty-first port P41 or forty-second port P42 of the trailer control valve TCV. At a non-actuating position where the brake pedal BP is not stepped on, the brake valve BV discharges the compressed dry air through a first supply line between the brake valve BV and the forty-first port P41 or forty-second port P42 of the trailer control valve TCV. When the brake pedal BP is stepped on, the brake valve BV connects the twenty-first port P21 or twenty-second port P22 of the air dryer 5 with the forty-first port P41 or forty-second port P42 of the trailer control valve TCV, and fills the first supply line with the compressed dry air delivered from the twenty-first port P21 or twenty-second port P22 of the air dryer 5. The brake valve BV also changes the delivery amount of the compressed dry air in accordance with the stepped amount of the brake pedal BP.

The pressure switch PSW is provided to the first supply line. The pressure switch PSW is switched on when the pressure has reached the upper limit value (e.g., 450 kPa) or more, and outputs an electric signal to a brake lamp BL to turn on the brake lamp BL. The upper limit value of the pressure switch PSW may be suitably changed.

A second supply line is branched from an upstream line of the brake valve BV, and is positioned between the twenty-first port P21 or twenty-second port P22 of the air dryer 5 and a first control chamber 7a (pressure control valve PCV). The second supply line is provided with the second air tank T2 and the second relay valve RV2. The first control chamber 7a controls the service brake of the spring brake chamber 7. The second air tank T2 temporarily stores the compressed dry air delivered from the twenty-first port P21 or twenty-second port P22 of the air dryer 5. The second relay valve RV2 is a pilot valve driven by the supply of the compressed dry air from the first supply line that connects the twenty-first port P21 or twenty-second port P22 of the air dryer 5 to the trailer control valve TCV. When no compressed dry air is supplied from the first supply line (i.e., when the brake pedal BP is not stepped on), the second relay valve RV2 discharges the compressed dry air contained in a portion of the second supply line between the second relay valve RV2 and the first control chamber 7a (pressure control valve PCV). When the compressed dry air is supplied from the first supply line (i.e., when the brake pedal BP is stepped on), the second relay valve RV2 fills the portion of the second supply line between the second air tank T2 and the first control chamber 7a (pressure control valve PCV) with the compressed dry air from the second air tank T2. As a result, the service brake is actuated.

The first supply line is provided with a pressure control valve PCV. The pressure control valve PCV controls the pressure, thereby controlling the braking effect of the service brake while the brake pedal BP is being stepped on.

The brake lamp BL is connected to an ABSECU 30 configured to control an antilock brake system (ABS), and outputs an electric signal to the ABSECU 30 when the pressure switch PSW is switched on. The ABSECU 30 controls the service brake via the pressure control valve PCV depending on the conditions of the vehicle.

The air dryer ECU 11 and the ABSECU 30 are connected to each other via an in-vehicle network NW such as a CAN for transmitting the data of mutually connected devices. The ABSECU 30 transmits to the air dryer ECU 11 the operating conditions of the service brake via the in-vehicle network NW. The in-vehicle network NW is further connected with a display 20 configured to control a vehicle-indoor instrument panel and a buzzer for outputting a warning sound. In the vicinity of the driver's seat is provided an electric parking brake switch EPBSW operated by the driver. When the electric parking brake switch EPBSW is switched on, the display 20 transmits an ON signal to the air dryer ECU 11 and the like via the in-vehicle network NW. Upon acquiring the operation information of the electric parking brake switch EPBSW via the in-vehicle network NW, the air dryer ECU 11 actuates the parking brake. Further, the air dryer ECU 11 performs failure detection via the in-vehicle network NW, and maintains the current status of the parking brake when a failure is detected.

Next, the operations of the parking brake circuit 14 will be described with reference to FIG. 2.

The parking valve PV is driven by the driver 13. When the first solenoid S1 is electrified, the parking valve PV is shifted to the filling position. At the filling position, the compressed dry air delivered from the air dryer 5 is further delivered to the forty-third port P43 of the trailer control valve TCV through the test position valve TPV. Further, the compressed dry air delivered from the air dryer 5 is supplied to the first supply port P1 of the shuttle valve SV via the supply line branched from a portion between the parking valve PV and the test position valve TPV. When the brake pedal BP is not stepped on, the compressed dry air is discharged through the supply line (the second supply line) of the service brake circuit 15 connected to the second supply port P2. Thus, the upstream side of the shuttle valve SV exhibits the higher pressure. Therefore, the shuttle valve SV delivers the compressed dry air to the first relay valve RV1 through the deliver port P3 in accordance with the pressure of the first supply port P1. With this operation, the first relay valve RV1 delivers the compressed dry air of the twenty-fifth port P25 to the second control chamber 7b.

The driver 13 shifts the parking valve PV to the neutral position when an error occurs at electric control lines and the like of the air dryer ECU 11. Further, when the pressure value detected by the pressure sensor PU is in conformity with the braking mode suited to the conditions of the vehicle, the driver 13 also shifts the parking valve PV to the neutral position. When the pressure value is not in conformity with the braking mode, the driver 13 electrifies the parking valve PV. The parking valve PV remains at the neutral position even after the power source such as the engine has been stopped and the parking brake has been actuated, in order to maintain the conditions where the parking brake has been actuated.

When the parking valve PV is shifted by the driver 13 to the neutral position, the parking valve PV blocks the supply line from the twenty-fifth port P25 to the test position valve TPV through the parking valve PV, and the supply line connected to the shuttle valve SV. At this time, when the test position valve TPV is electrified, the compressed dry air from the twenty-fifth port P25 of the air dryer 5 is delivered to the forty-third port P43 of the trailer control valve TCV through the test position valve TPV.

When the brake pedal BP is not stepped on with the parking valve PV shifted to the neutral position, the upstream side of the shuttle valve SV exhibits relatively high pressure. When the brake pedal BP is stepped on, the downstream side of the shuttle valve SV exhibits relatively high pressure. Therefore, the compressed dry air is supplied to the first relay valve RV1 at the flow rate conforming to the pressure at the upstream side. With this operation, the compressed dry air is supplied from the twenty-fifth port P25 of the air dryer 5 to the second control chamber 7b.

When the test position valve TPV is not electrified with the parking valve PV located in the discharge position, the compressed dry air is discharged from the supply line connecting the test position valve TPV with the trailer control valve TCV, through the parking valve PV. With this operation, the trailer control valve TCV delivers the compressed dry air from the twenty-second port P22 and actuates the emergency valve (not shown) for the trailer 2. As a result, an emergency brake for the trailer 2 is actuated.

When the parking valve PV is shifted to the discharge position by the driver 13, the compressed dry air is discharged from the supply line connected to the shuttle valve SV. When the brake pedal BP is not stepped on, the upstream pressure of the shuttle valve SV is in equilibrium with the downstream pressure of the shuttle valve SV, and the supply of the compressed dry air to the first relay valve RV1 is stopped. As a result, the compressed dry air within the second control chamber 7b is discharged through the first relay valve RV1, and a spring of the spring brake chamber 7 returns to the original position, thereby actuating the parking brake.

Further, in the supply line from the parking valve PV to the trailer control valve TCV, the compressed dry air is discharged from the parking valve PV. With this operation, the trailer control valve TCV supplies the compressed dry air from the twenty-second port P22 and actuates the emergency valve for the trailer 2.

Next, the operations of the entire brake system will be described with reference to FIGS. 3 to 8.

<Start of Operation>

Figure 3:
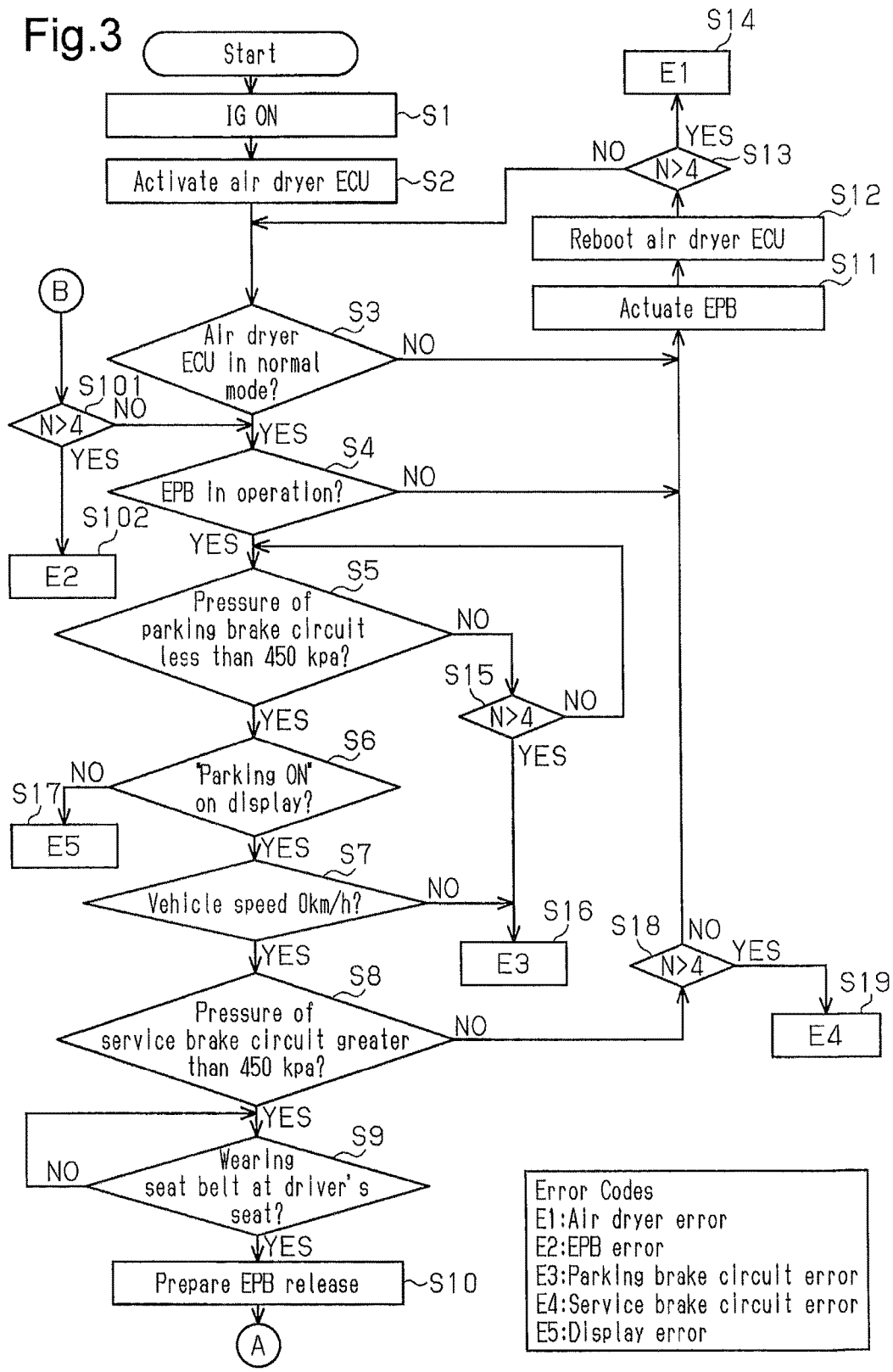
FIG. 3 is a flowchart illustrating operations of a parking brake system.

The operations from the parking status to the release of the parking brake will be described with reference to FIG. 3. Typically in the parking status, no compressed dry air is supplied to the second control chamber 7b, and the spring keeps the parking brake in operation.

When the ignition (IG) is switched on (ON status) (step S1), the air dryer ECU 11 is activated in the brake system (step S2).

The air dryer ECU 11 first determines whether the air dryer ECU 11 is in a normal mode (step S3). More specifically, the air dryer ECU 11 determines whether the air dryer ECU 11 is normally operable. As a result, when determining that the air dryer ECU 11 is not in a normal mode (i.e., an error occurs) (step S3: NO), the air dryer ECU 11 actuates an electric parking brake (EPB) (step S11).

Subsequently, in order to recover to the normal mode, the air dryer ECU 11 reboots the air dryer ECU 11 (step S12), and repeats this process until the air dryer ECU 11 recovers to the normal mode (step S13: NO). The air dryer ECU 11 repeats the rebooting multiple times (four times in this example) (step S13: YES), and causes the display 20 to display an error code "E1" indicative of the air dryer 5 having an error (step S14).

In contrast, determining that the air dryer ECU is in the normal mode (step S3: YES), the air dryer ECU 11 determines whether the electric parking brake (EPB) is in operation (step S4). When determining that the electric parking brake (EPB) is not in operation (step S4: NO), the air dryer ECU 11 proceeds to step S11.

When determining that the electric parking brake (EPB) is in operation (step S4: YES), the air dryer ECU 11 determines whether the pressure of the parking brake circuit is less than the upper limit value (450 kPa in this example) (step S5). More specifically, when the pressure of the parking brake circuit as detected by the pressure sensor PU is less than 450 kPa, it is determined that the parking brake is in operation with the spring of the spring brake chamber 7. As a result, when determining that the pressure of the parking brake circuit is 450 kPa or more (step S5: NO), the air dryer ECU 11 repeatedly makes the determinations until the pressure of the parking brake circuit becomes less than 450 kPa (step S15: NO). When determining that the pressure of the parking brake circuit is 450 kPa or more after repeating the determination multiple times (four times in this example) (step S15: YES), the air dryer ECU 11 causes the display 20 to display an error code "E3" indicative of the parking brake circuit 14 having an error (step S14).

In contrast, when determining that the pressure of the parking brake circuit is less than 450 kPa (step S5: YES), the air dryer ECU 11 determines whether the display 20 is displaying "Parking On" (step S6). As a result, when determining that the display 20 is not displaying "Parking On" (step S6: NO), the air dryer ECU 11 causes the display 20 to display an error code "E5" indicative of the display 20 having an error, or alerts the driver to the error by sound or the like (step S17).

When determining that the display 20 is displaying "Parking On" (step S6: YES), the air dryer ECU 11 determines whether, for example, the vehicle speed is 0 km/h in order to determine that the vehicle is not traveling (step S7). As a result, when determining that the vehicle speed is not 0 km/h (step S7: NO), the air dryer ECU 11 then proceeds to step S16.

In contrast, when determining that the vehicle speed is 0 km/h (step S7: YES), the air dryer ECU 11 determines whether the pressure of the service brake circuit 15 is more than 450 kPa (step S8). More specifically, when the pressure switch PSW detects a pressure that is greater than the upper limit value (450 kPa), the pressure of the service brake circuit 15 is greater than 450 kPa. Thus, it is determined that the brake pedal BP is being stepped on. As a result, when determining that the pressure of the service brake circuit 15 is 450 kPa or less (step S8: NO), the air dryer ECU 11 repeats steps S11 to S13. When having repeated the determination multiple times (four times in this example) (step S18: NO) to determine that the pressure of the service brake circuit 15 is 450 kPa or less (step S18: YES), the air dryer ECU 11 causes the display 20 to display an error code "E4" indicative of the service brake circuit 15 having an error (step S19).

When determining that the pressure of the service brake circuit 15 is greater than 450 kPa (step S8: YES), the air dryer ECU 11 determines whether the driver wears the seat belt at the driver's seat (step S9). When determining that the driver does not wear the seat belt at the driver's seat (step S9: NO), the air dryer ECU 11 repeatedly makes the determination.

In contrast, when determining that the driver wears the seat belt at the driver's seat (step S9: YES), the air dryer ECU 11 makes a preparation for releasing the electric parking brake (EPB) (step S10). More specifically, when the vehicle speed reaches a predetermined value or more with the accelerator pedal stepped on, the air dryer ECU 11 automatically releases the parking brake. Alternatively, when the electric parking brake switch EPBSW is manually operated, the air dryer ECU 11 releases the parking brake based on such a manual operation.

<Manual Operation>

Figure 4:
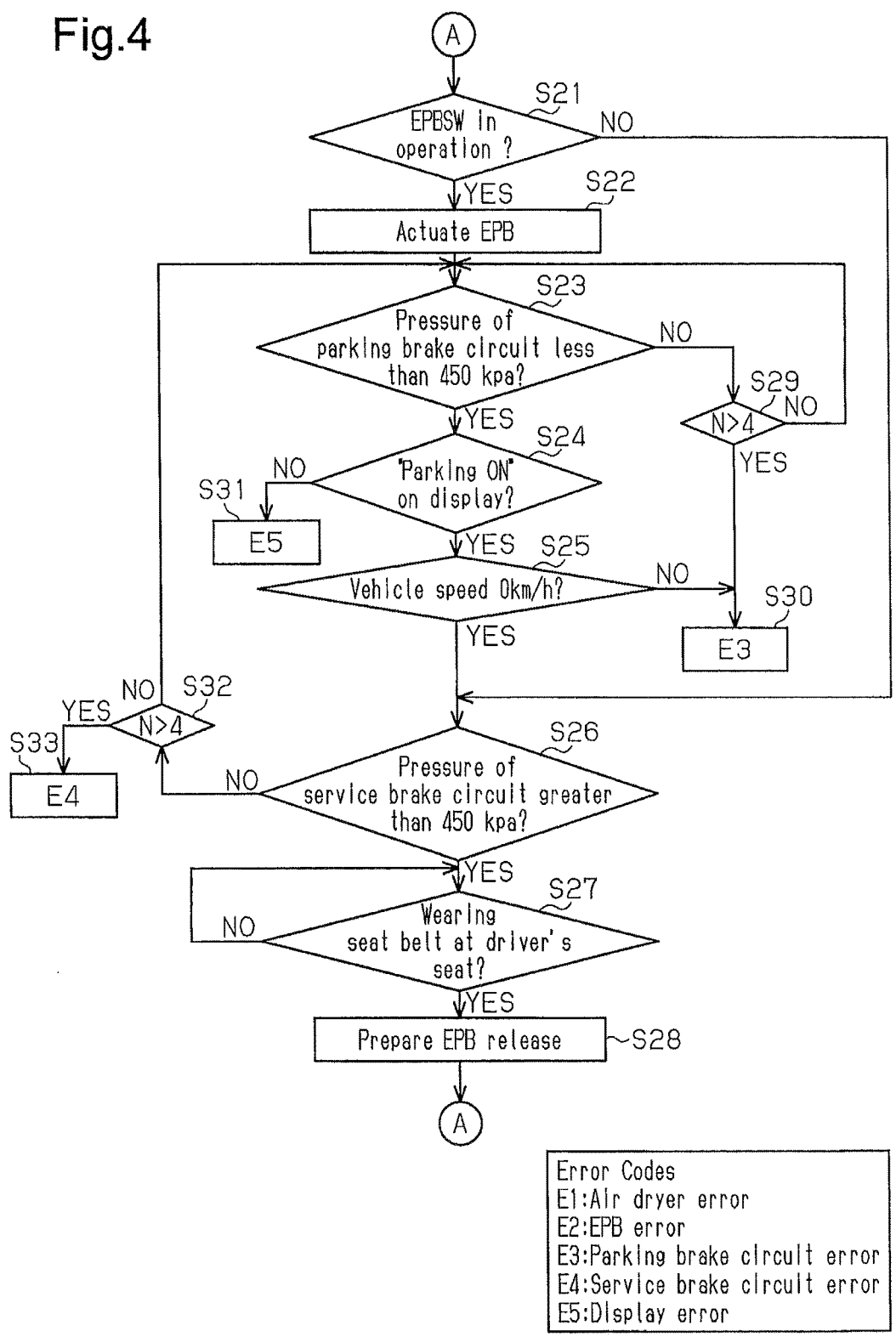
FIG. 4 is a flowchart illustrating operations of the parking brake system.

Next, operations to be performed when the electric parking brake switch EPBSW is manually operated will be described with reference to FIG. 4. These operations are commenced with the trigger being the continuation of the press operation or the pull operation on the electric parking brake switch EPBSW.

The air dryer ECU 11 determines whether the electric parking brake switch EPBSW is in operation (step S21). More specifically, the air dryer ECU 11 determines whether the electric parking brake switch EPBSW has been operated to actuate the parking brake. When determining that the electric parking brake switch EPBSW is not in operation (step S21: NO), the air dryer ECU 11 proceeds to step S26.

In contrast, when determining that the electric parking brake switch EPBSW is in operation (step S21: YES), the air dryer ECU 11 actuates the electric parking brake (EPB) at step S22.

Subsequently, the air dryer ECU 11 determines whether the pressure of the parking brake circuit 14 is less than 450 kPa (step S23). More specifically, when the pressure of the parking brake circuit 14 as detected by the pressure sensor PU is less than 450 kPa, it is determined that the parking brake is in operation with the spring of the spring brake chamber 7. As a result, when determining that the pressure of the parking brake circuit is 450 kPa or more (step S23: NO), the air dryer ECU 11 repeatedly makes the determination until the pressure of the parking brake circuit 14 becomes less than 450 kPa (step S29: NO). When having repeated the determination multiple times (four times in this example) to determine that the pressure of the parking brake circuit 14 is 450 kPa or more (step S29: YES), the air dryer ECU 11 causes the display 20 to display the error code "E3" indicative of the parking brake circuit 14 having an error (step S30).

When determining that the pressure of the parking brake circuit 14 is less than 450 kPa (step S23: YES), the air dryer ECU 11 determines whether the display 20 is displaying "Parking On" (step S24). As a result, when determining that the display 20 is not displaying "Parking On" (step S24: NO), the air dryer ECU 11 causes the display 20 to display the error code "E5" indicative of the display 20 having an error or alerts the driver to the error by sound or the like (step S31).

In contrast, when determining that the display 20 is displaying "Parking On" (step S24: YES), the air dryer ECU 11 determines whether the vehicle speed is 0 km/h (step S25). More specifically, the air dryer ECU 11 determines that the vehicle is not traveling. When determining that the vehicle speed is not 0 km/h (step S25: NO), the ECU 11 proceeds to step S30.

When determining that the vehicle speed is 0 km/h (step S25: YES), the air dryer ECU 11 determines whether the pressure of the service brake circuit 15 is greater than 450 kPa (step S26). More specifically, when the pressure switch PSW detects a pressure that is greater than the upper limit value (450 kPa), it is determined that the brake pedal BP is being stepped on with the pressure of the service brake circuit 15 being greater than 450 kPa. When determining that the pressure of the service brake circuit 15 is 450 kPa or less (step S26: NO), the air dryer ECU 11 repeats the determination multiple times (four times in this example) (step S32: NO). When determining that the pressure of the service brake circuit 15 is 450 kPa or less (step S32: YES), the air dryer ECU 11 causes the display 20 to display the error code "E4" indicative of the service brake circuit 15 having an error (step S33).

When determining that the pressure of the service brake circuit 15 is more than 450 kPa (step S26: YES), the air dryer ECU 11 determines whether the driver wears the seat belt at the driver's seat (step S27). When determining that the driver does not wear the seat belt at the driver's seat (step S27: NO), the air dryer ECU 11 repeatedly makes the determination.

In contrast, when determining that the driver wears the seat belt at the driver's seat (step S27: YES), the air dryer ECU 11 prepares the release of the electric parking brake (EPB) at step S28. More specifically, when the accelerator pedal is stepped on and the vehicle speed reaches a predetermined value or more, the air dryer ECU 11 automatically releases the parking brake or alternatively, releases the parking brake based on the manual operation on the electric parking brake switch EPBSW.

<Automatic Release Operation>

Next, operations to be performed when the release of the electric parking brake EPB is prepared will be described with reference to FIG. 5. These operations are for automatically releasing the electric parking brake EPB with the trigger being the release of the electric parking brake EPB having been prepared.

The air dryer ECU 11 determines whether the release of the electric parking brake EPB has been prepared (step S41). More specifically, determination is made as to whether the release preparation has been made for the release of the parking brake. When determining that the release of the electric parking brake EPB is not prepared (step S41: NO), the air dryer ECU 11 proceeds to step S101 shown in FIG. 3 and determines whether the release of the electric parking brake EPB is prepared multiple times (four times in this example) (step S101: NO, steps S4 to S10 and S41).

In contrast, when it has been determined multiple times (four times in this example) that the release of the electric parking brake EPB is not prepared (step S101: YES) although the release of the electric parking brake EPB is prepared (step S10), the air dryer ECU 11 causes the display 20 to display an error code "E2" indicative of the electric parking brake EPB having an error (step S102).

Figure 5:
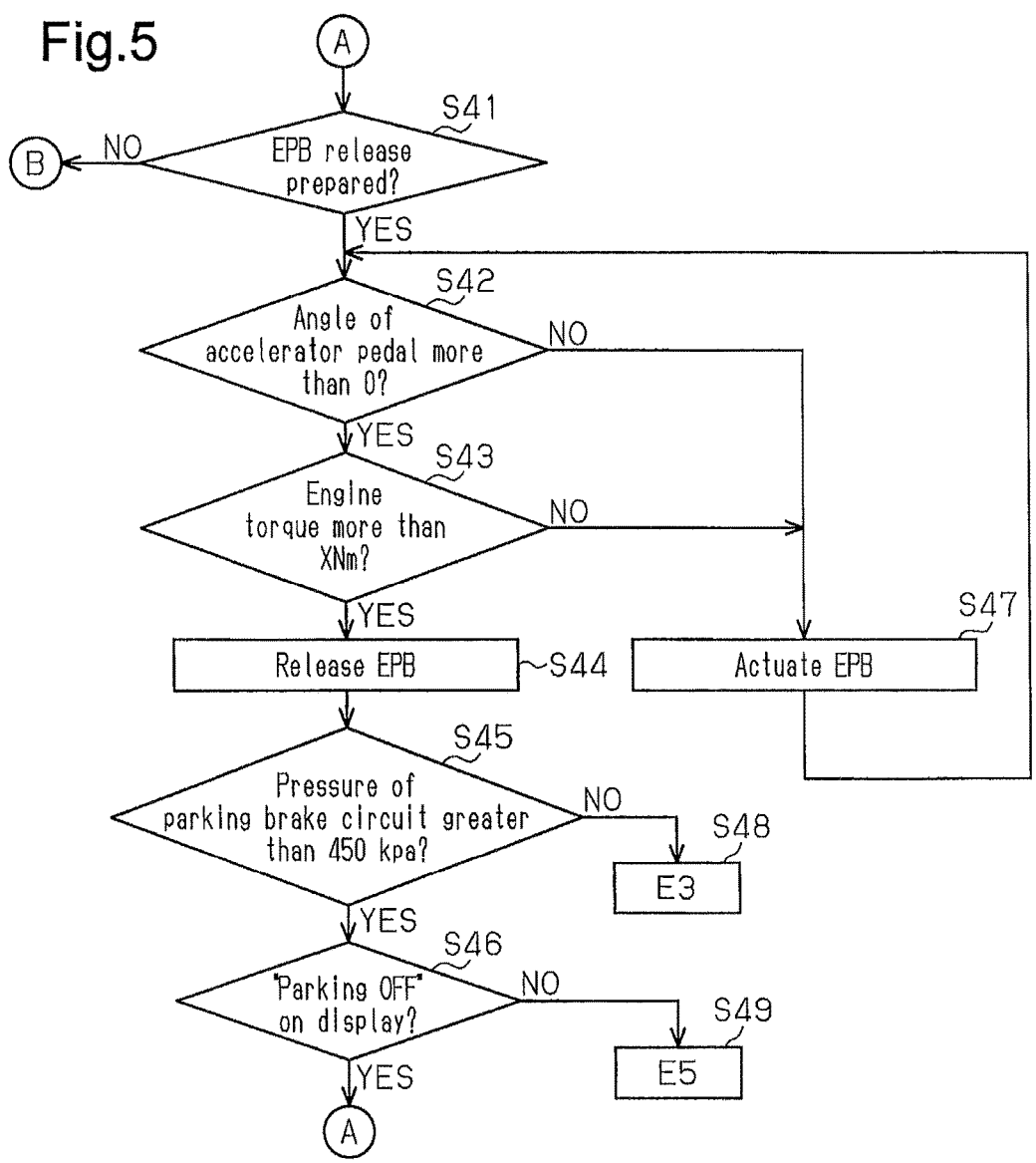
FIG. 5 is a flowchart illustrating operations of the parking brake system.

Subsequently, as shown in FIG. 5, when determining that the release of the electric parking brake EPB has been prepared (step S41: YES), the air dryer ECU 11 determines whether the operation amount of the accelerator pedal (e.g., the stepping angle of the accelerator pedal) is more than 0 (step S42). More specifically, determination is made as to whether the accelerator pedal is stepped on by the driver to drive the vehicle. When determining that the stepping angle of the accelerator pedal is 0 (step S42: NO), the air dryer ECU 11 actuates the electric parking brake EPB (step S47) and proceeds to step S42.

When determining that the stepped angle of the accelerator pedal is more than 0 (step S42: YES), the air dryer ECU 11 determines whether the engine torque is more than a predetermined value (X Nm) (step S43). When determining that the engine torque is the predetermined value (X Nm) or less (step S43: NO), the air dryer ECU 11 actuates the electric parking brake EPB (step S47) and then proceeds to step S42.

When determining that the engine torque is more than the predetermined value (X Nm) (step S43: YES), the air dryer ECU 11 releases the electric parking brake EPB (step S44).

Subsequently, the air dryer ECU 11 determines whether the pressure of the parking brake circuit 14 is more than 450 kPa (step S45). More specifically, when the pressure of the parking brake circuit 14 as detected by the pressure sensor PU is 450 kPa or less, it is determined that the parking brake is in operation with the spring of the spring brake chamber 7. When determining that the pressure of the parking brake circuit is 450 kPa or less (step S45: NO), the air dryer ECU 11 causes the display 20 to display the error code "E3" indicative of the parking brake circuit 14 having an error (step S48).

In contrast, when determining that the pressure of the parking brake circuit is more than 450 kPa (step S45: YES), the air dryer ECU 11 determines whether the display 20 is displaying "Parking Off" (step S46). When determining that the display 20 is not displaying "Parking Off" (step S46: NO), the air dryer ECU 11 causes the display 20 to display the error code "E5" indicative of the display 20 having an error (step S49). When the display on the display 20 is not possible, the air dryer ECU 11 alerts the driver to the error by sound or the like.

When determining that the display 20 is displaying "Parking Off" (step S46: YES), the air dryer ECU 11 remains to stand by until the next operation.

<Manual Release Operation>

Next, alternative operations to be performed when the release of the electric parking brake EPB is prepared will be described with reference to FIG. 6. These operations are for manually releasing the electric parking brake EPB when the release of the electric parking brake EPB is prepared.

The air dryer ECU 11 determines whether the release of the electric parking brake EPB is prepared (step S51). More specifically, determination is made as to whether the release preparation has been made for releasing the parking brake. When determining that the release of the electric parking brake EPB is not prepared (step S51: NO), the air dryer ECU 11 proceeds to step S101 shown in FIG. 3 and determines whether the release of the electric parking brake EPB is prepared multiple times (four times in this example) (step S101: NO, steps S4 to S10 and S51).

In contrast, when it has been determined multiple times (four times in this example) that the release of the electric parking brake EPB is not prepared (step S101: YES) although the release of the electric parking brake EPB is prepared (step S10), the air dryer ECU 11 causes the display 20 to display the error code "E2" indicative of the electric parking brake EPB having an error (step S102).

Figure 6:
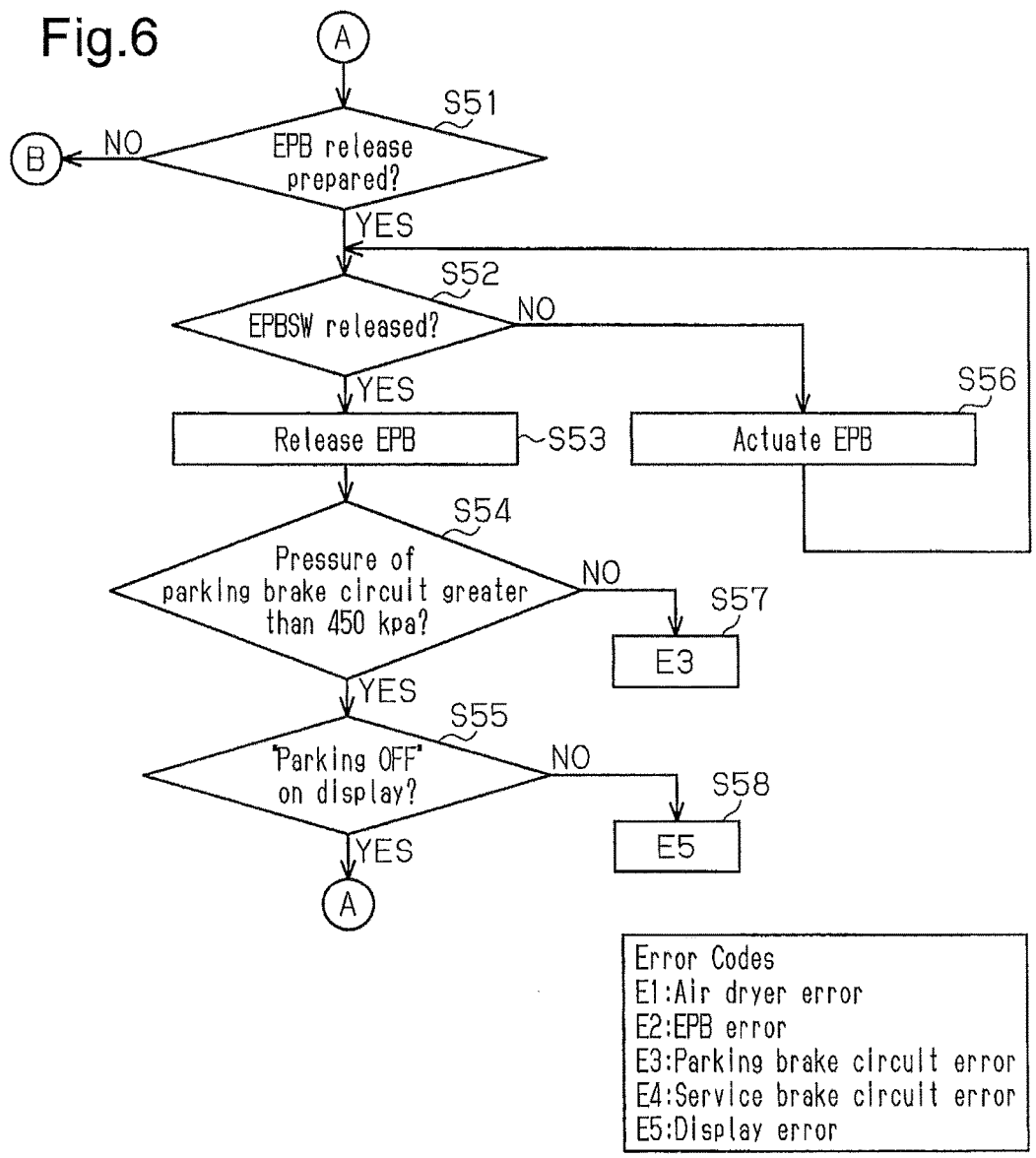
FIG. 6 is a flowchart illustrating operations of the parking brake system.

As shown in FIG. 6, the air dryer ECU 11 determines whether the electric parking brake switch EPBSW has been released (step S52). More specifically, determination is made as to whether the electric parking brake switch EPBSW has been released to release the parking brake. When determining that the electric parking brake switch EPBSW is not released (i.e., the electric parking brake switch EPBSW is in operation) (step S52: NO), the air dryer ECU 11 actuates the electric parking brake EPB (step S56) and proceeds to step S52.

In contrast, when determining that the electric parking brake switch EPBSW is released (step S52: YES), the air dryer ECU 11 causes the electric parking brake (EPB) to be released (step S53).

Subsequently, the air dryer ECU 11 determines whether the pressure of the parking brake circuit 14 is greater than 450 kPa (step S54). More specifically, when the pressure of the parking brake circuit 14 as detected by the pressure sensor PU is 450 kPa or less, it is determined that the parking brake is in operation with the spring of the spring brake chamber 7. When determining that the pressure of the parking brake circuit is 450 kPa or less (step S54: NO), the air dryer ECU 11 causes the display 20 to display the error code "E3" indicative of the parking brake circuit 14 having an error (step S57).

In contrast, when determining that the pressure of the parking brake circuit is more than 450 kPa (step S54: YES), the air dryer ECU 11 determines whether the display 20 is displaying "Parking Off" (step S55). When determining that the display 20 is not displaying "Parking Off" (step S55: NO), the air dryer ECU 11 causes the display 20 to display the error code "E5" indicative of the display 20 having an error (step S58). When the display on the display 20 is not possible, the air dryer ECU 11 alerts the driver to the error by sound or the like.

When determining that the display 20 is displaying "Parking Off" (step S55: YES), the air dryer ECU 11 remains to stand by until the next operation.

<Operations During Loss of Power Source>

Figure 7:
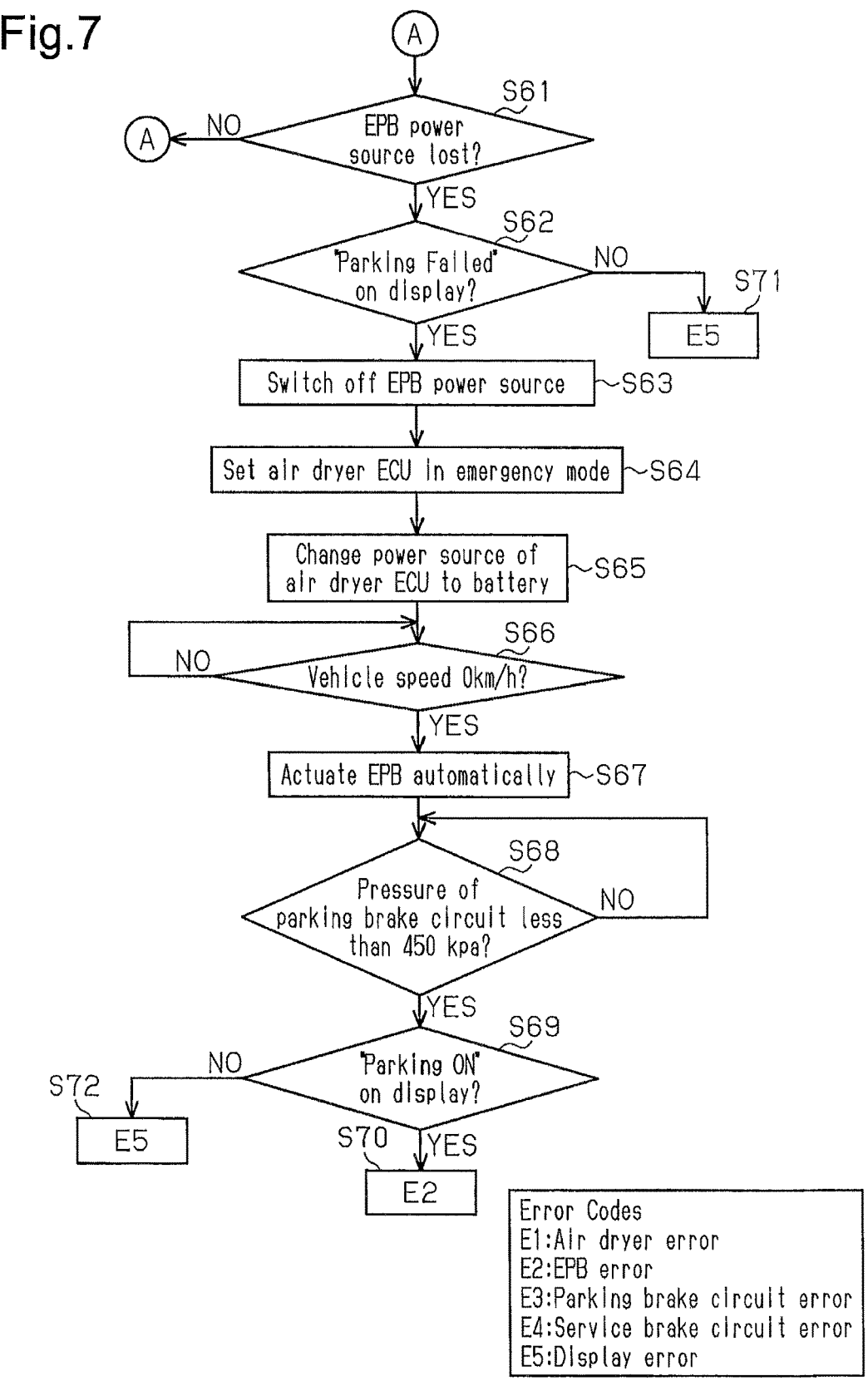
FIG. 7 is a flowchart illustrating operations of the parking brake system.

Next, operations to be performed when the power source for the electric parking brake EPB is lost will be described with reference to FIG. 7. These operations are commenced with the trigger being the loss of the power source for the electric parking brake EPB.

The air dryer ECU 11 determines whether the electric parking brake EPB has lost the power source (step S61). More specifically, determination is made as to whether the parking brake has lost the power source. When determining that the electric parking brake EPB has not lost the power source (step S61: NO), the air dryer ECU 11 remains to stand by until the next operation.

In contrast, when determining that the electric parking brake EPB has lost the power source (step S61: YES), the air dryer ECU 11 determines whether the display 20 is displaying "Parking Failed" (step S62). When determining that the display 20 is not displaying "Parking Failed" (step S62: NO), the air dryer ECU 11 causes the display 20 to display the error code "E5" indicative of the display 20 having an error (steps S62). When the display on the display 20 is not possible, the air dryer ECU 11 alerts the driver to the error by sound or the like.

When determining that the display 20 is displaying "Parking Failed" (step S62: YES), the air dryer ECU 11 switches off the electric parking brake EPB (step S63). Then, the air dryer ECU 11 sets up the emergency mode (step S64) and changes the power source to a battery (step S65).

Subsequently, the air dryer ECU 11 determines whether the vehicle speed is 0 km/h (step S66). More specifically, determination is made to check whether the vehicle is in a stopped state. When determining that the vehicle speed is not 0 km/h (step S66: NO), the air dryer ECU 11 repeats the determination until the vehicle speed becomes 0 km/h.

In contrast, when determining that the vehicle speed is 0 km/h (step S66: YES), the air dryer ECU 11 causes the electric parking brake EPB to be automatically actuated (step S67).

Subsequently, the air dryer ECU 11 determines whether the pressure of the parking brake circuit 14 is less than 450 kPa (step S68). More specifically, when the pressure of the parking brake circuit 14 as detected by the pressure sensor PU is less than 450 kPa, it is determined that the parking brake is in operation with the spring of the spring brake chamber 7. When determining that the pressure of the parking brake circuit is 450 kPa or more (step S68: NO), the air dryer ECU 11 repeats the determination until the pressure of the parking brake circuit 14 becomes less than 450 kPa.

When determining that the pressure of the parking brake circuit is less than 450 kPa (step S68: YES), the air dryer ECU 11 determines whether the display 20 is displaying "Parking On" (step S69). When determining that the display 20 is not displaying "Parking On" (step S69: NO), the air dryer ECU 11 causes the display 20 to display the error code "E5" indicative of the display 20 having an error (step S72). When the display on the display 20 is not possible, the air dryer ECU 11 alerts the driver to the error by sound or the like.

When determining that the display 20 is displaying "Parking On" (step S69: YES), the air dryer ECU 11 causes the display 20 to display the error code "E2" indicative of the electric parking brake EPB having an error (step S102).

<Operation Stop>

Figure 8:
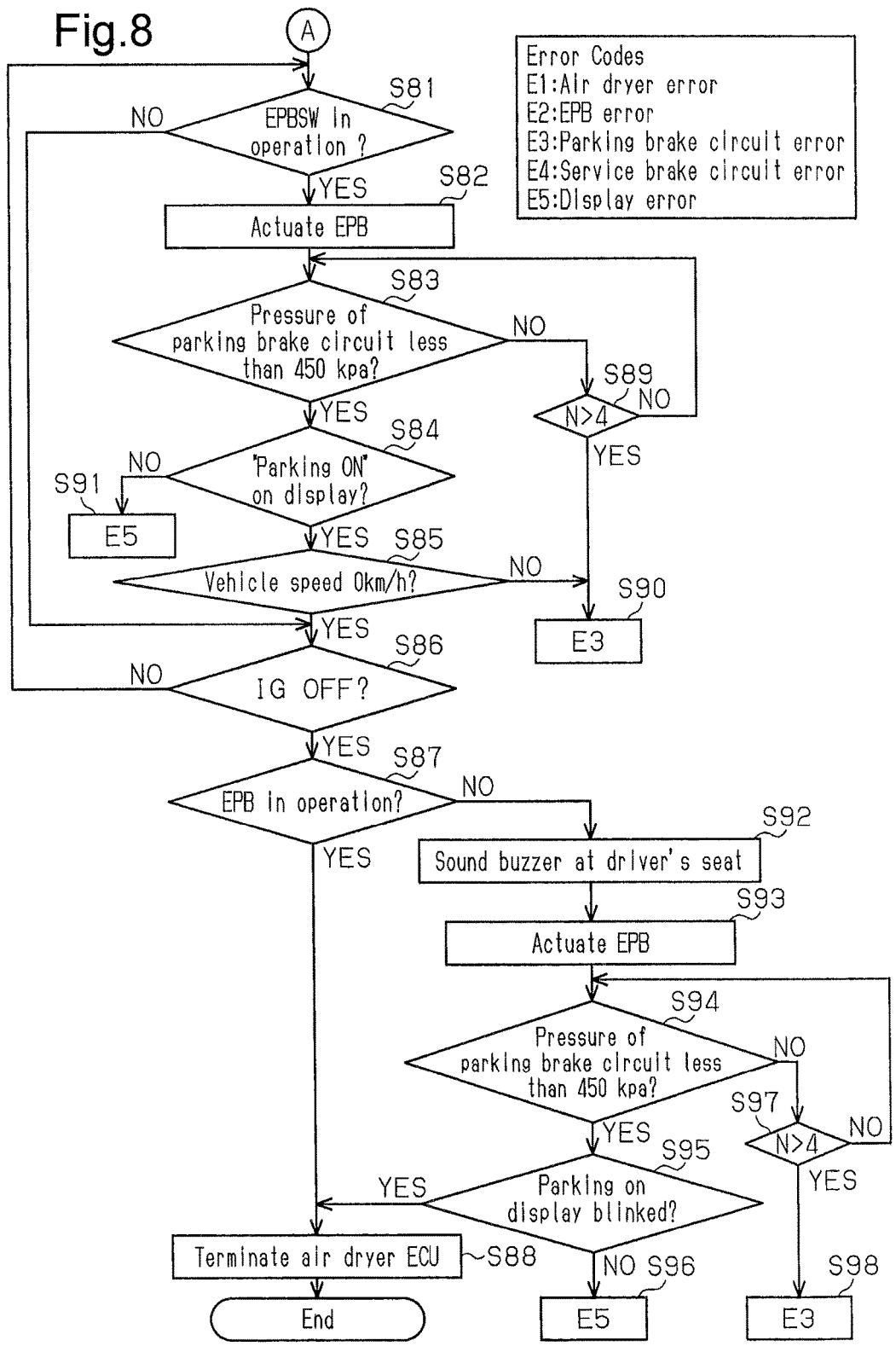
FIG. 8 is a flowchart illustrating operations of the parking brake system.

With reference to FIG. 8, next, a description will be given of operations after the stop of the vehicle and before the commencement of the actuation of the parking brake. When the vehicle is stopped, the service brake is normally in operation with the brake pedal BP stepped on.

The air dryer ECU 11 determines whether the electric parking brake switch EPBSW is in operation (step S81). More specifically, determination is made as to whether the electric parking brake switch EPBSW is in operation for actuating the parking brake. When determining that the electric parking brake switch EPBSW is not in operation (step S81: NO), the air dryer ECU 11 proceeds to step S86.

In contrast, when determining that the electric parking brake switch EPBSW is in operation (step S81: YES), the air dryer ECU 11 actuates the electric parking brake (EPB) (step S82). Then, the air dryer ECU 11 determines whether the pressure of the parking brake circuit 14 is less than 450 kPa (step S83). More specifically, when the pressure of the parking brake circuit 14 as detected by the pressure sensor PU is less than 450 kPa, it is determined that the parking brake is in operation with the spring of the spring brake chamber 7. When determining that the pressure of the parking brake circuit is 450 kPa or more (step S83: NO), the air dryer ECU 11 repeatedly makes the determination until the pressure of the parking brake circuit 14 becomes less than 450 kPa (step S89: NO). When determining that the pressure of the parking brake circuit 14 is 450 kPa or more by repeating the determination multiple times (four times in this example) (step S89: YES), the air dryer ECU 11 causes the display 20 to display the error code "E3" indicative of the parking brake circuit 14 having an error (step S90).

When determining that the pressure of the parking brake circuit 14 is less than 450 kPa (step S83: YES), the air dryer ECU 11 determines whether the display 20 is displaying "Parking On" (step S84). When determining that the display 20 is not displaying "Parking On" (step S84: NO), the air dryer ECU 11 causes the display 20 to display the error code "E5" indicative of the display 20 having an error, alerts the driver to the error by sound or the like (step S91).

In contrast, when determining that the display 20 is displaying "Parking On" (step S84: YES), the air dryer ECU 11 determines whether the vehicle speed is 0 km/h (step S85). More specifically, the air dryer ECU 11 determines that the vehicle is not traveling. When determining that the vehicle speed is not 0 km/h (step S85: NO), the air dryer ECU 11 proceeds to step S90.

When determining that the vehicle speed is 0 km/h (step S85: YES), the air dryer ECU 11 determines whether the ignition (IG) is off (OFF state) (step S86). More specifically, the air dryer ECU 11 determines whether the engine 3 of the vehicle is in a stopped state. When determining that the ignition (IG) is on (ON state) (step S86: NO), the air dryer ECU 11 proceeds to step S81.

When determining that the ignition (IG) is in the OFF state (step S86: YES), the air dryer ECU 11 determines whether the electric parking brake (EPB) is in operation (step S87). When determining that the electric parking brake (EPB) is in operation (step S87: YES), the air dryer ECU 11 terminates its processing (step S88).

When determining that the electric parking brake (EPB) is not in operation (step S87: NO), the air dryer ECU 11 causes the display 20 to sound a buzzer at the driver's seat (step S92). Subsequently, the air dryer ECU 11 actuates the electric parking brake (EPB) (step S93). The air dryer ECU 11 then determines whether the pressure of the parking brake circuit 14 is less than 450 kPa (step S94). When determining that the pressure of the parking brake circuit is 450 kPa or more (step S94: NO), the air dryer ECU 11 repeatedly makes the determination until the pressure of the parking brake circuit 14 becomes less than 450 kPa (step S97: NO). When determining that the pressure of the parking brake circuit 14 is 450 kPa or more by repeating the determination multiple times (four times in this example) (step S97: YES), the air dryer ECU 11 causes the display 20 to display the error code "E3" indicative of the parking brake circuit 14 having an error (step S98).

In contrast, when determining that the pressure of the parking brake circuit 14 is less than 450 kPa (step S94: YES), the air dryer ECU 11 determines whether the display of parking on the display 20 has blinked (step S95). When determining that the display of parking on the display 20 has not blinked (step S95: NO), the air dryer ECU 11 causes the display 20 to display the error code "E5" indicative of the display 20 having an error, or alerts the occupant to the error by sound or the like (step S96).

When determining that the display of parking on the display 20 has blinked (step S95: YES), the air dryer ECU 11 proceeds to step S92.

As described above, the present embodiment achieves the following advantages.

(1) The air dryer ECU 11 electrically controls the parking brake via the actuator 12. More specifically, the air dryer ECU 11 actuates the actuator 12 by an electric signal, and the actuator 12 provided to the axle actuates the parking brake. Therefore, the electric control is enabled in a configuration where the air brake is used.

Further, as compared to a configuration where the controller is provided to each of the axles, the size of the devices provided at the axle is reduced. Further still, since each component from the air dryer ECU 11 through the actuators 12 of the axles are driven by an electric signal, the responsiveness is further enhanced as compared to a mechanical system controlled only by compressed dry air.

(2) By electrifying the parking valve PV (solenoid valve), the first relay valve RV1, and the like with the driver 13, the parking brake is actuated with the compressed dry air.

(3) The air dryer ECU 11 easily acquires the operation information of the parking brake through the in-vehicle network NW.

(4) When a failure is detected, the air dryer ECU 11 maintains the current status of the parking brake. Thus, a safe operation is realized by maintaining the current status even when a failure (e.g., failure in the supply of the compressed dry air) occurs.

The embodiment described above may be modified as will be described below.

In the embodiment described above, the parking brake system is applied to a trailer, but may be applied to other vehicles such as trucks. When the parking brake system is applied to a truck, the trailer control valve TCV is omitted, and each axle is provided with the actuator 12, such that each actuator 12 is controlled by the air dryer ECU 11.

Figure 9:
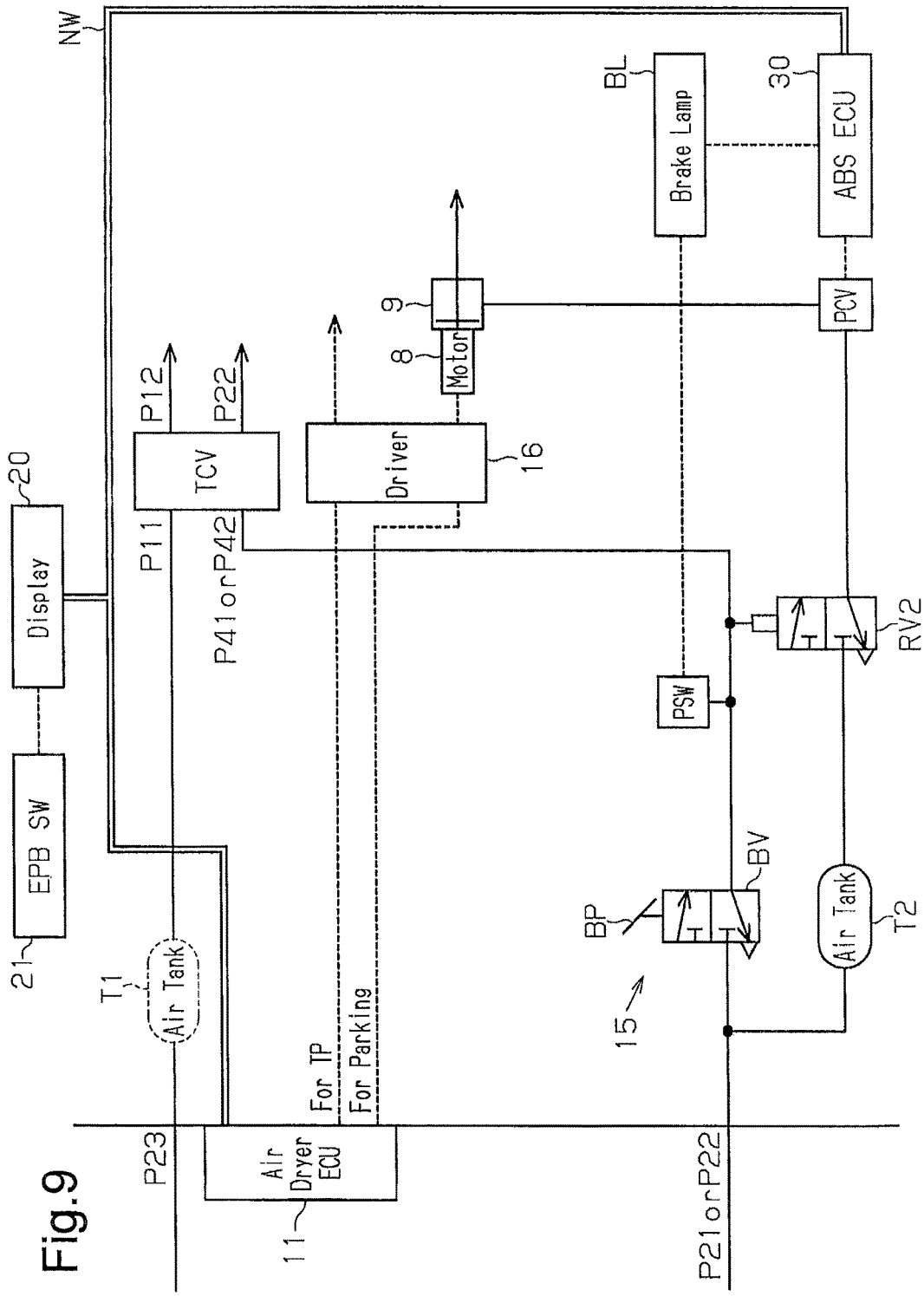
FIG. 9 is a diagram illustrating a parking brake system according to a modification.

As shown in FIG. 9, the air dryer ECU 11 may directly output to the driver 16 the control signal for actuating the parking brake, to actuate the parking brake by the chamber 9 driven by the motor 8.

In the embodiment described above, the service brake is configured to be controlled via the ABSECU 30 (i.e., the controller for the antilock brake system (ABS)). However, the service brake may be configured to be controlled via another controller such as an electronically-controlled brake system (EBS) or a traction control system (TCS).

In the embodiment described above, when a failure is detected, the air dryer ECU 11 maintains the current status of the parking brake, but the current status of the parking brake does not have to be maintained.

In the embodiment described above, the air dryer ECU 11 acquires the operation information of the parking brake through the in-vehicle network NW, but the operation information of the parking brake may be directly acquired without the in-vehicle network NW.

DESCRIPTION OF THE REFERENCE NUMERALS

1 . . . Tractor;
2 . . . Trailer;
3 . . . Engine;
4 . . . Compressor;
5 . . . Air Dryer;
6 . . . Service Brake Chamber;
7 . . . Spring Brake Chamber;
7a . . . First Control Chamber;
7b . . . Second Control Chamber;
8 . . . Motor;
9 . . . Chamber;
11 . . . Air Dryer ECU;
12 . . . Actuator;
13 . . . Driver;
14 . . . Parking Brake Circuit;
15 . . . Service Brake Circuit;
20 . . . Display;
30 . . . ABSECU;
BL . . . Brake Lamp;
BP . . . Brake Pedal;
BV . . . Brake Valve;
EPBSW . . . Electric Parking Brake Switch;
NW . . . In-Vehicle Network;
P1 . . . First Supply Port;
P2 . . . Second Supply Port;
P3 . . . Output Port;
P11 . . . Eleventh Port;
P12 . . . Twelfth Port;
P21 . . . Twenty-First Port;
P22 . . . Twenty-Second Port;
P23 . . . Twenty-Third Port;
P25 . . . Twenty-Fifth Port;
P41 . . . Forty-First Port;
P42 . . . Forty-Second Port;
P43 . . . Forty-Third Port;
PCV . . . Pressure Control Valve;
PSW . . . Pressure Switch;
PU . . . Pressure Sensor;
PV . . . Parking Valve;
RV1 . . . First Relay Valve;
RV2 . . . Second Relay Valve;
S1 . . . First Solenoid;
S2 . . . Second Solenoid;
S3 . . . Third Solenoid;
SV . . . Shuttle Valve;
T1 . . . First Air Tank;
T2 . . . Second Air Tank;
TCV . . . Trailer Control Valve;
TPV . . . Test Position Valve;
W1 . . . First Axle;
W2 . . . Second Axle;
WF . . . Axle Of Front Wheel;
WR . . . Axle Of Rear Wheel

The invention claimed is:

1. A parking brake system for electrically controlling a parking brake of a vehicle, the parking brake system comprising:
an air dryer controller provided to an air dryer, the air dryer being configured to dry compressed air for use in the parking brake;
a pressure sensor configured to detect a pressure value of the dry compressed air that is supplied to the parking brake;
wherein the air dryer controller is configured to determine an operating condition of the parking brake based on the detected pressure value and to output an electric signal based on the determination to electrically control the parking brake; and
an actuator configured to actuate the parking brake with the dry compressed air in accordance with the electric signal from the air dryer controller,
wherein the actuator includes
a solenoid valve configured to control supply of the dry compressed air to the parking brake, and
a driver configured to actuate the parking brake by electrifying the solenoid valve based on the electric signal from the air dryer controller,
wherein the solenoid valve has
a filling position where the dry compressed air from the air dryer is delivered to a delivery port on a downstream side of the solenoid valve for delivering the compressed air for use by the actuator to actuate the parking brake,
a neutral position where supply of the dry compressed air from the air dryer is blocked from flowing through the solenoid valve, and
a discharge position connecting to a discharge port on the downstream side leading outside the parking brake system where the dry compressed air is discharged through the discharge port, and
wherein the driver is electrically connected to the solenoid valve, wherein the driver is configured to switch the solenoid valve between the filling position, the neutral position, and the discharge position by electrifying the solenoid valve.

2. The parking brake system according to claim 1, wherein the air dryer controller is connected to an in-vehicle network configured to transmit data of mutually connected devices, and wherein the air dryer controller is configured to acquire operation indication information of the parking brake through the in-vehicle network.

3. The parking brake system according to claim 2, wherein the air dryer controller is configured to perform failure detection through the in-vehicle network, and wherein the air dryer controller is configured to maintain current status of the parking brake when detecting a failure.

4. The parking brake system according to claim 1, wherein the air dryer controller is configured to determine one or more of:
- whether the parking brake is actuated when the vehicle is activated from its parking status;
- when a parking brake switch is operated, whether the parking brake is actuated according to the operation of the parking brake switch;
- whether the parking brake is released before the vehicle starts to drive;
- whether the parking brake is actuated when a power source for the vehicle is lost; and
- whether the parking brake is actuated when the vehicle stops.

5. The parking brake system according to claim 1, wherein the air dryer controller is configured to, when the vehicle is activated from its parking status, determine that the parking brake can be released if
- the pressure value is equal to or less than a predetermined value;
- the vehicle speed is zero;
- a brake pressure of a service brake is equal to or greater than a predetermined value; and
- seating of a vehicle driver in the vehicle is detected.

6. The parking brake system according to claim 1, wherein the air dryer controller is configured to determine that a parking brake switch is off and the parking brake can be released if
- the parking brake switch is on;
- the pressure value is equal to or less than a predetermined value;
- the vehicle speed is zero;
- a brake pressure of a service brake is equal to or greater than a predetermined value; and
- seating of a vehicle driver in the vehicle is detected.

7. The parking brake system according to claim 1, wherein the air dryer controller is configured to permit the parking brake to be released if
- an accelerator pedal is stepped on before the vehicle starts to drive, and
- an engine torque reaches a predetermined value or more.

8. The parking brake system according to claim 1, wherein the air dryer controller is configured to permit the parking brake to be actuated if
- a power source for the vehicle is lost, and
- the vehicle speed is zero.

9. The parking brake system according to claim 1, wherein the air dryer controller is configured to, when the vehicle stops, permit an ignition to be switched off if
- the vehicle speed is zero, and
- the parking brake is actuated.

* * * * *